US012644038B2

(12) United States Patent
Li et al.

(10) Patent No.: US 12,644,038 B2
(45) Date of Patent: Jun. 2, 2026

(54) SURFACTANT AND PREPARATION METHOD THEREFOR

(71) Applicants: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Yingcheng Li, Shanghai (CN); Weidong Zhang, Shanghai (CN); Jun Jin, Shanghai (CN); Zhiqin Shen, Shanghai (CN); Xinning Bao, Shanghai (CN); Ou Sha, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Beijing (CN)

( * ) Notice: Subject to any disclaimer, the term of this patent is extended or adjusted under 35 U.S.C. 154(b) by 1036 days.

(21) Appl. No.: 17/756,080

(22) PCT Filed: Oct. 30, 2020

(86) PCT No.: PCT/CN2020/125017

§ 371 (c)(1), (2) Date: May 16, 2022

(87) PCT Pub. No.: WO2021/093601

PCT Pub. Date: May 20, 2021

(65) Prior Publication Data

US 2022/0403225 A1 Dec. 22, 2022

(30) Foreign Application Priority Data

Nov. 14, 2019 (CN) ........................ 201911109924.4

(51) Int. Cl.
*C09K 8/584* (2006.01)

(52) U.S. Cl.
CPC .................................. *C09K 8/584* (2013.01)

(58) Field of Classification Search
None
See application file for complete search history.

(56) References Cited

U.S. PATENT DOCUMENTS

| | | | |
|---|---|---|---|
| 3,451,936 | A | 6/1969 | Nobile et al. |
| 7,629,299 | B2 | 12/2009 | Berger et al. |

(Continued)

FOREIGN PATENT DOCUMENTS

| | | | |
|---|---|---|---|
| CN | 1203935 | A | 1/1999 |
| CN | 1426833 | A | 7/2003 |

(Continued)

OTHER PUBLICATIONS

Ma, Tao et al.; "Property evaluation of synthesized anionic-nonionic gemini surfactants for chemical enhanced oil recovery"; Colloids and Surfaces A: Physiochemical and Engineerings Aspects, Elsevier, Amsterdam, NL, vol. 581, 123800; Aug. 14, 2019; pp. 1-8.

(Continued)

*Primary Examiner* — John J Figueroa
(74) *Attorney, Agent, or Firm* — NKL Law; Allen Xue

(57) ABSTRACT

A heteroatom-containing alkoxy polyether based anionic-nonionic surfactant has the following molecular formula (I):

$$R_1—O\text{-}(Poly)_n\text{-}X—Y^{a-}\cdot a/bM^{b+} \quad (I).$$

In formula (I), $R_1$ is any one of $C_1$-$C_{50}$ aliphatic group and aromatic group; each occurrence of group Poly, equal to or different from each other, is independently selected from the (Continued)

group represented by formula $(Ru—O)_m$; n is a number from greater than 0 to 300; for each type of group (Ru—O), m is independently a number from greater than 0 to 100; X is any one of alkylene, alkenylene and arylene containing 1-10 carbon atoms; Y is an anionic group; and M is a cation or a cationic group.

16 Claims, 4 Drawing Sheets

(56) References Cited

U.S. PATENT DOCUMENTS

| | | | |
|---|---|---|---|
| 2010/0282467 A1* | 11/2010 | Hutchison .............. | C09K 8/584 166/305.1 |
| 2011/0120707 A1 | 5/2011 | Berger et al. | |
| 2011/0281779 A1* | 11/2011 | Weerasooriya .... | C08G 65/2609 562/110 |
| 2012/0101010 A1 | 4/2012 | Weerasooriya et al. | |
| 2014/0116690 A1 | 5/2014 | Bittner et al. | |
| 2020/0063017 A1* | 2/2020 | Todd ........................ | E21B 37/06 |
| 2022/0403225 A1 | 12/2022 | Li et al. | |

FOREIGN PATENT DOCUMENTS

| | | | |
|---|---|---|---|
| CN | 1458219 | A | 11/2003 |
| CN | 1566258 | A | 1/2005 |
| CN | 1702093 | A | 11/2005 |
| CN | 102492460 | A | 6/2012 |
| CN | 102676143 | A | 9/2012 |
| CN | 103554468 | A | 2/2014 |
| CN | 103740354 | A | 4/2014 |
| CN | 104232030 | A | 12/2014 |
| CN | 104277814 | A | 1/2015 |
| CN | 105277814 | A | 1/2016 |
| CN | 107557055 | A | 1/2018 |
| EP | 4059982 | A1 | 9/2022 |
| NO | 20160047 | A1 | 1/2016 |
| RU | 2065455 | C1 | 8/1996 |
| RU | 2208020 | C2 | 7/2003 |
| RU | 2564031 | C2 | 9/2015 |
| RU | 2653537 | C2 | 5/2018 |
| WO | 2018219654 | A1 | 12/2018 |
| WO | 2021093601 | A1 | 5/2021 |

OTHER PUBLICATIONS

Zhang, Yongmin et al.; "Synthesis and Properties of Nonyl Phenol Polyethyleneoxy Ether Sulfonate"; Speciality Petrochemicals; Mar. 2009, vol. 26, No. 2, pp. 4-7.

Zhang, Yongmin et al.; "The Salt-tolerance of Sodium Nonyl Phenol Polyoxyethylene Ether Sulfonates and Their Mixtures With a Heavy Alkylbenzene Sulfonate"; Oilfield Chemistry; Mar. 25, 2009; vol. 26, No. 1, pp. 72-75.

Zhang, Yongmin et al.; "Study on the Properties of Sodium Fatty Alcohol Polyoxyethylene Ether Sulfonate"; Chemical Research and Application; Jul. 2009; vol. 21, No. 7;pp. 964-968.

Zhang, Yongmin et al.; "Progress in Synthesis of Aliphatic Alcohol Ether Sulfonate Surfactant"; China Surfactant Detergent & Cosmetics; Aug. 2008; vol. 38, No. 4; pp. 253-256.

Adkins Stephanie et al.; "Development of Thermally and Chemically Stable Large-Hydrophobe Alkoxy Carboxylate Surfactants"; SPE Journal; Apr. 14-18, 2012; pp. 1-10; Paper No. SPE-154256-MS.

Lu, Jun et al.; "Novel Large-Hydrophobe Alkoxy Carboxylate Surfactants for Enhanced Oil Recovery"; SPE Journal; Dec. 17, 2014; vol. 19, No. 06, pp. 1024-1034; Paper No. SPE-154261-PA.

* cited by examiner

SURFACTANT AND PREPARATION METHOD THEREFOR

TECHNICAL FIELD

The invention relates to a surfactant and a preparation method thereof, in particular to a heteroatom-containing alkoxy polyether based anionic-nonionic surfactant and a process of producing same.

BACKGROUND

With the increase of energy demand, the reasonable development and utilization of petroleum have attracted great attention of people, and the requirements on the production quantity and the production efficiency of the petroleum are higher and higher. Efficient exploitation of oil and gas resources has not only practical significance but also important strategic significance for improving the yield of crude oil. Conventional oil recovery processes (primary and secondary recovery) typically recover only ⅓ of the geological reserves of the oil, while about ⅔ of the oil has not been recovered, and thus an enhanced oil recovery has been a significant subject of oil recovery research. The tertiary oil recovery technology is an effective process for enhancing oil recovery and can be divided into four categories, namely: the first being thermal flooding, including steam flooding, in-situ combustion and the like; the second being miscible flooding, which comprises $CO_2$ miscible flooding, hydrocarbon miscible flooding and other inert gas miscible flooding; the third being chemical flooding; and the fourth being microbial oil recovery, including biopolymer and microbial surfactant flooding. Among tertiary oil recovery technologies, the chemical enhanced oil recovery (CEOR) technology represents a very important and large-scale implemented technology, including the polymer flooding technology, the surfactant flooding technology, the alkali water flooding technology and a combination thereof. The effect of chemical flooding is the result of a combination of physical action, which refers to the sweeping action of the displacement fluid, and chemical action, which refers to the microscopic displacement action of the displacement fluid. The key to the chemical action is to reduce the interfacial tension between the displacement fluid and the crude oil and improve the oil washing efficiency. The surfactant has both oleophilic (hydrophobic) and hydrophilic (oleophobic) properties, so when the surfactant is dissolved in water, molecules are mainly distributed on an oil-water interface, and the oil-water interface tension can be remarkably reduced. The reduction in the oil-water interfacial tension indicates that the surfactant is capable of defeating the cohesive force inside crude oil, dividing larger oil droplets into smaller ones, whereby increasing the passing rate of crude oil through a pore throat. The flooding function observed with a surfactant is further indicated by the effects like alteration in the surface wettability of oleophilic rock, emulsification of crude oil, increment of the surface charge density and oil droplet coalescence, all of which explain why the surfactant has been identified as a critical component in a flooding fluid.

At present, the most widely used tertiary oil recovery surfactants are petroleum sulfonate, alkylbenzene sulfonate, olefin sulfonate salts and other surfactants, see CN1203935A, CN1566258A, CN1458219A, CN1426833A and US 2010/0282467. The surfactant has the advantages of wide source, low cost and the like. However, with the increasingly deep exploitation degree of the oil field, the oil extraction stratum is deeper and deeper, the use temperature of the surfactant is higher and higher, and the mineralization of water is also higher and higher. However, the salt tolerance of the surfactants is poor, especially to tolerate divalent cations, so that the surfactants cannot be applied to high-temperature and high-salinity oilfield blocks. Therefore, the development of novel heat-resistant and salt-resistant surfactants has great significance for the tertiary oil recovery industry.

In recent years, anionic-nonionic surfactants have been studied because they have both the heat resistance of anionic surfactants and the salt resistance of nonionic surfactants. The anionic-nonionic surfactants mainly comprise alkoxy carboxylate, alkoxy sulfonate, alkoxy sulfate salts and the like. For example, Yongmin ZHANG, Hujun X U and the like respectively report the performances of anionic-nonionic surfactants such as nonylphenol polyoxyethylene ether sodium sulfonate, fatty alcohol polyoxyethylene ether sodium sulfonate and the like (see: *Specialty Petrochemicals,* 2009, 26 (2), 4-7*; Oilfield Chemistry,* 2009, 26 (1), 72-75*; Chemical Research and Application,* 2009, 21 (7), 964-968*; China Surfactant Detergent & Cosmetics,* 2008, 38 (4), 253-256; and CN 201210188897.6). The use of anionic-nonionic surfactants such as alkoxy carboxylates and alkoxy sulfonates in enhanced oil recovery has also been reported by Oastin university of Texas, USA, Oil Chem Technology, BASF, respectively (see SPE 154256; SPE 154261; U.S. Pat. No. 7,629,299; US20120101010; US2011120707A1; US20140116690A1). In the above anionic-nonionic surfactants, the nonionic moiety is solely ethoxy and/or propoxy. In US20110281779, an anionic-nonionic surfactant of $R_1$—$BO_x$—$PO_y$-$EO_z$—X—$Y^{a-}{}_{a/b}$ $M^{b+}$ containing a butoxy (BO), propoxy (PO), ethoxy (EO) nonionic segment is disclosed, which shows superior performance, wherein $R_1$ is dimerized from a C12-C36 linear or branched fatty alcohol via a Guerbet reaction.

SUMMARY OF THE INVENTION

The invention relates to a novel alkoxy polyether based anionic-nonionic surfactant containing heteroatoms, wherein the molecular structure of the surfactant simultaneously contains the heteroatoms N and S, and composite polyether functional groups BO, PO and EO, so that the surfactant is favorable for accurately regulating and controlling the interaction between the surfactant and crude oil, and the technical problems of poor emulsifying property and low activity of the surfactant in the prior enhanced oil recovery technology are solved. Meanwhile, the lipophilic group is not limited to the traditional lipophilic C8-C18 carbon chain any more, thereby greatly widening the source of raw materials and reducing the production cost. In addition, in terms of the selection of the lipophilic group, the invention prefers to simultaneously contain an aliphatic lipophilic group and an aromatic lipophilic group, so that the interaction between the lipophilic group and the crude oil is enhanced, and the oil displacement performance is improved.

One of the technical problems to be solved by the invention is the technical problem of poor emulsifying property and low activity of the surfactant in the prior art under the conditions of high temperature and high salt; and the problem of narrow raw material source and high production cost of the surfactant. Accordingly, the invention provides a novel heteroatom-containing alkoxy polyether based anionic-nonionic surfactant, which has the advantages of good emulsifying capacity and high activity, and can contain aliphatic and aromatic lipophilic groups, so that the interaction between the surfactant and crude oil is enhanced, and the oil displacement performance is improved.

The second technical problem to be solved by the invention is to provide a process of producing heteroatom-containing alkoxy polyether based anionic-nonionic surfactant. The process has the characteristics of simple procedures, mild reaction conditions and high product yield.

The invention provides use of the heteroatom-containing alkoxy polyether based anionic-nonionic surfactant.

In order to solve one of the technical problems, the invention provides a heteroatom-containing alkoxy polyether based anionic-nonionic surfactant having a molecular formula of:

$$R_1\text{—O-(Poly)}_n\text{-X—}Y^{a-}\cdot a/bM^{b+};\quad (I)$$

wherein:

- $R_1$ is any one of $C_1$-$C_{50}$ aliphatic group or aromatic group;
- each occurrence of group Poly, equal to or different from each other, is independently selected from the group represented by formula $(Ru\text{—}O)_m$; in each group Poly, the each occurrence of group Ru, equal to or different from each other, is independently selected from $C_{2-6}$ linear or branched alkylene groups, with the proviso that: the group Ru in at least a part of the groups Poly is selected from butylene, and there is a spacer group L between at least a part of the groups Poly; wherein the L is a group containing a heteroatom and two free ends having 0 to 30 carbon atoms;
- n is a number from greater than 0 to 300;
- for each type of group (Ru—O), m is independently a number from greater than 0 to 100;
- X is any one of alkylene, alkenylene or arylene containing 1-10 carbon atoms;
- Y is an anionic group;
- M is a cation or cationic group maintaining charge balance of the formula; and
- a is the absolute value of the valence of Y, and b is the absolute value of the valence of M.

In one embodiment, $R_1$ is preferably any one of $C_1$-$C_{50}$ alkyl, alkenyl, aryl, or polycyclic aromatic hydrocarbon; more preferably any one of $C_1$-$C_{30}$ alkyl, alkenyl, aryl and polycyclic aromatic hydrocarbon; and the heteroatom is preferably N and/or S.

In one embodiment, $L_1$ and $L_2$ are at least one independently and preferably selected from the group consisting of $\text{—}NR_6\text{—}$, —S—, and $\text{—}X^1\text{—}R_5\text{—}X^2\text{—}$, wherein $X^1$ and $X^2$ are independently and preferably selected from $NR_6$ or S, $R_5$ is preferably any one selected from $C_0$-$C_{10}$ alkylene, alkenylene and arylene, and $R_6$ is preferably selected from H or $C_1$-$C_4$ alkyl; wherein when $R_5$ is preferably selected from $C_0$, it means that $\text{—}X^1\text{—}X^2\text{—}$ are directly connected.

In one embodiment, the $R_5$ is more preferably any one selected from $C_0$-$C_6$ alkylene, alkenylene, and arylene groups, and $R_6$ is more preferably selected from H.

In one embodiment, the polymerization degrees of x, y and z of the alkoxy groups are independently any number of 1 to 100, and are more independently any number of 1 to 50.

In one embodiment, the X is preferably any one of an alkylene group, an alkenylene group, and an arylene group containing 1 to 6 carbon atoms.

In one embodiment, the anionic group Y is preferably at least one of carboxylate, sulfonate, sulfate, or phosphate, more preferably at least one of carboxylate or sulfonate.

In one embodiment, the M is preferably at least one selected from the group consisting of an alkali metal cation, an alkaline earth metal cation, and an ammonium ion; more preferably at least one selected from the group consisting of $Na^+$, $K^+$, $Mg^{2+}$, $Ca^{2+}$, and $NH_4^+$.

In one embodiment, two or more identical or different spacer groups L are included in formula (I), and wherein at least one group Poly is positioned between two spacer groups L.

In one embodiment, in each of the groups Poly, at least a part of the group Ru of the groups Poly is selected from ethylene, at least a part of the group Ru of the groups Poly is selected from propylene or isopropylene, and at least a part of the group Ru of the groups Poly is selected from butylene, sec-butylene, isobutylene, or tert-butylene.

In one embodiment, at least two spacer groups L are included in formula (I), wherein at least a part of the groups L include heteroatom N and at least a part of the groups L include heteroatom S.

In one embodiment, in formula (I), the group Poly approaching to the $R_1$ side has more carbon atoms than the group Poly approaching to the X side.

In order to solve the second technical problem, the invention provides a process of producing a heteroatom-containing alkoxy polyether based anionic-nonionic surfactant according to any one of the above technical solutions, comprising the steps of:

a) carrying out an alkoxylation reaction on an initiator, ethylene oxide, propylene oxide and butylene oxide in the presence of a catalyst, to provide an alkoxy polyether nonionic surfactant; wherein the initiator is any one of $C_1$-$C_{50}$ alkyl alcohol, alkenyl alcohol, alkylphenol and polycyclic aromatic phenol;

b) reacting the alkoxy polyether nonionic surfactant obtained in step a) with an organic amine reagent or a thiol reagent, to provide an alkoxy polyether nonionic surfactant containing N and/or S heteroatoms; and c) carrying out sulfonation or carboxylation reaction on the alkoxy polyether nonionic surfactant containing the heteroatom obtained in step b) and a sulfonation reagent or a carboxylation reagent, and then neutralizing, to provide the alkoxy polyether based anionic-nonionic surfactant.

In one embodiment, the alkoxylation reaction is preferably carried out under conditions of: a reaction temperature of 140 to 200° C. and a reaction pressure of 0 to 5 MPa; a molar ratio of the initiator to the ethylene oxide, the propylene oxide or the butylene oxide of preferably 1:(1-50); and a catalyst of preferably an alkali metal hydroxide, di-metallic polyether catalyst (DMC) or phosphazene catalyst, preferably in an amount of 0.001 to 2.0% based on the initiator.

In one embodiment, step b) is carried out at a temperature of preferably 100 to 300° C. and a reaction pressure of preferably 0 to 5 MPa, for preferably 1 to 10 hours.

In one embodiment, the sulfonation or carboxylation reaction is carried out at a reaction temperature of preferably 80 to 200° C. and a reaction pressure of preferably 0 to 3 MPa, for preferably 1 to 10 hours.

In one embodiment, the alkoxylation reaction is carried out at a reaction temperature of more preferably 140 to 200° C. and a pressure of more preferably 0.1 to 2.0 MPa; step b) is carried out at a reaction temperature of more preferably 150-250° C. and a reaction pressure of more preferably 0.5-3 MPa; and step c) is carried out at a reaction temperature of more preferably 50 to 100° C. for more preferably 0.5 to 5 hours.

In one embodiment, the sulfonating agent may be various types of sulfonating agents commonly used in the art, such as halosulfonic acids or/and salts thereof, such as, but not limited to, chlorohexylsulfonic acid (or sodium salt thereof), p-chlorobenzenesulfonic acid (or sodium salt thereof), 3-chloro-2-hydroxy-propanesulfonic acid (or sodium salt thereof), 1-chloro-2-butene-sulfonic acid (or sodium salt thereof), and the like; while the carboxylation agent may be various types commonly used in the art, such as a halogenated carboxylic acid or/and a salt thereof, such as but not limited to chloroacetic acid (or sodium salt thereof).

In order to solve the third technical problem, the invention provides use of the heteroatom-containing alkoxy polyether based anionic-nonionic surfactant according to any of the preceding technical solutions to solve one of the technical problems.

In one embodiment, the use is not particularly limited, for example, but not limited to use in enhanced oil and gas field recovery, such as injecting an aqueous solution containing the surfactant of the present invention into the underground for enhanced oil and gas field recovery, wherein the surfactant may be used at a concentration of 0.01 wt % or more, preferably 0.05 wt % or more, and more preferably 0.05 to 1 wt %.

The heteroatom-containing alkoxy polyether based anionic-nonionic surfactant according to the present invention enhances the interaction between the surfactant and crude oil components by introducing the heteroatom, the alkoxy and the chain segment design, so that the surfactant has stronger emulsifying capacity and can better solubilize the crude oil; meanwhile, the oil washing capacity is good, so that the recovery efficiency is improved.

The heteroatom-containing alkoxy polyether based anionic-nonionic surfactant has the following advantages when being used in a surfactant composition for tertiary oil recovery:

(1) The surfactant has high interfacial activity and strong emulsifying capacity. When the concentration is more than 0.05%, an ultra-low interfacial tension of $10^{-3}$-$10^{-4}$ mm/N can be formed with underground crude oil, and the solubilization parameter reaches 12 or more.

(2) The surfactant has high resistance to heat and salt. Because the surfactant contains nonionic groups such as BO, PO, EO and the like, the salt resistance of the surfactant is obviously improved; and different functional groups are connected through C—C bonds or C—O bonds, so that the hydrothermal stability is high.

(3) The $R_1$ connected with the alkoxy can be any one of $C_1$-$C_{50}$ aliphatic group and aromatic group, and the surfactant has wide raw material source and low preparation cost.

In the present invention, the "anionic-nonionic surfactant" refers to a surfactant having both an anionic segment and a nonionic segment in the structure, as is well known in the art.

Compared with the prior art, the heteroatom-containing alkoxy polyether based anionic-nonionic surfactant has better emulsifying capacity and higher interfacial activity, the solubilizing parameter of the surfactant to crude oil can reach 18 or more, the interfacial tension can reach $10^{-4}$ mm/N, the recovery rate can be increased by 15% or more, and better technical effects are achieved.

DESCRIPTION OF DRAWINGS

FIG. 3 shows NMR spectra of the heteroatom-containing alkoxy polyether based anionic-nonionic surfactant prepared according to Example 3 of the present invention, wherein,

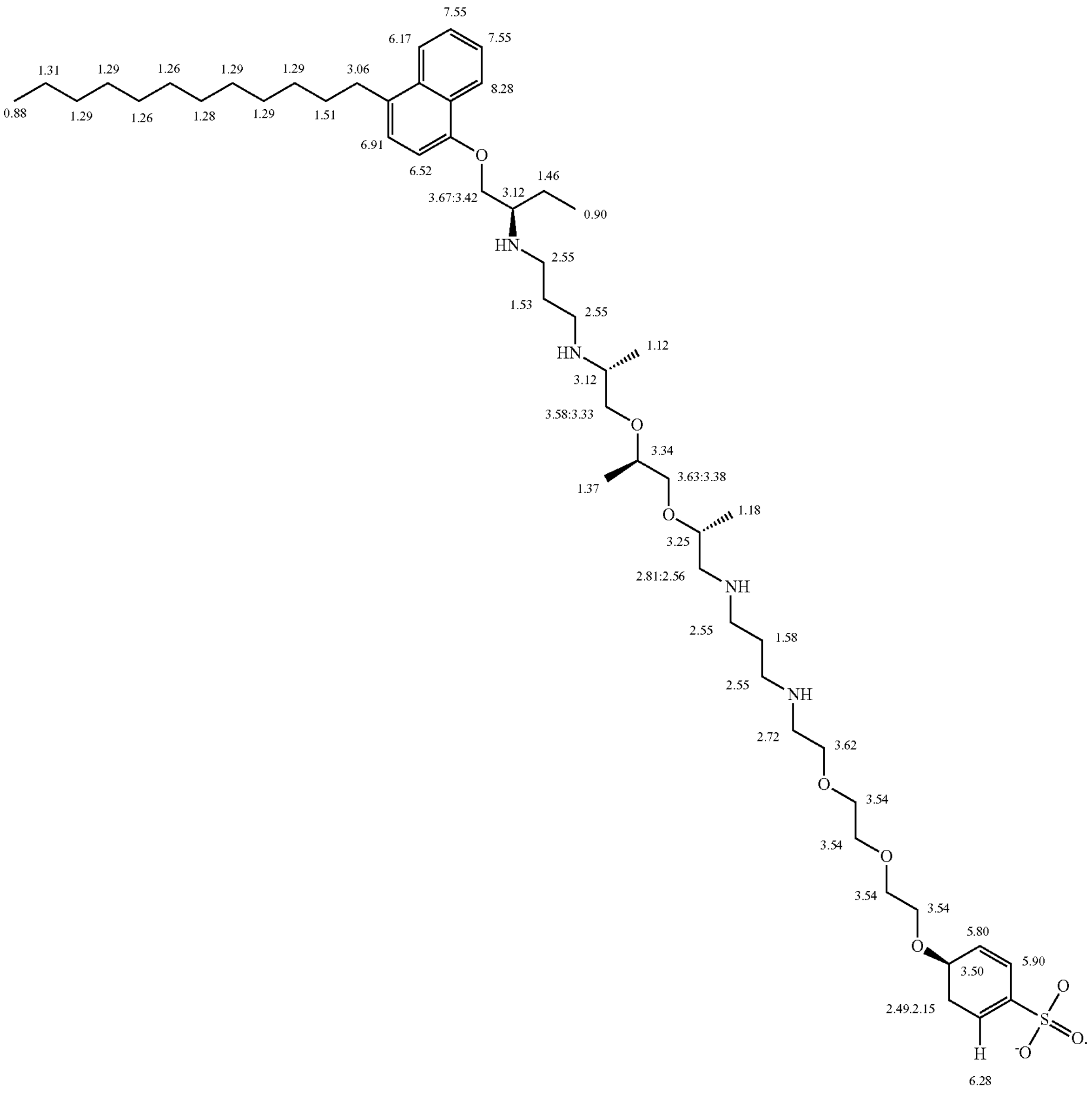

Figure 1:
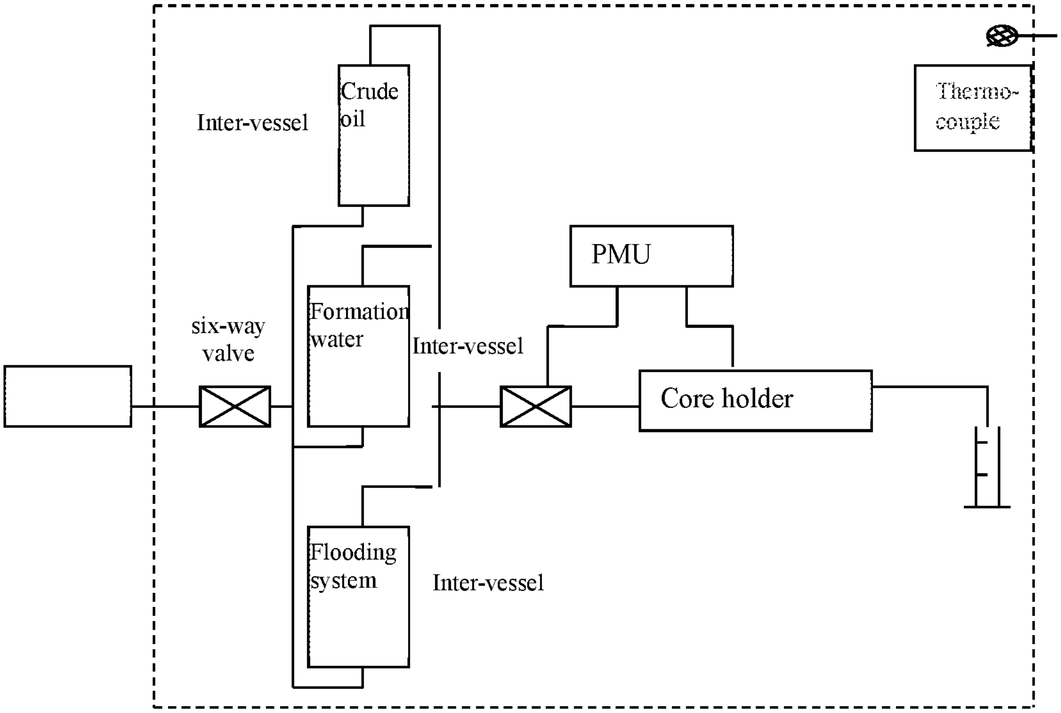
FIG. 1 is a flow chart of an indoor core displacement experiment used in the present invention.
Figure 2:
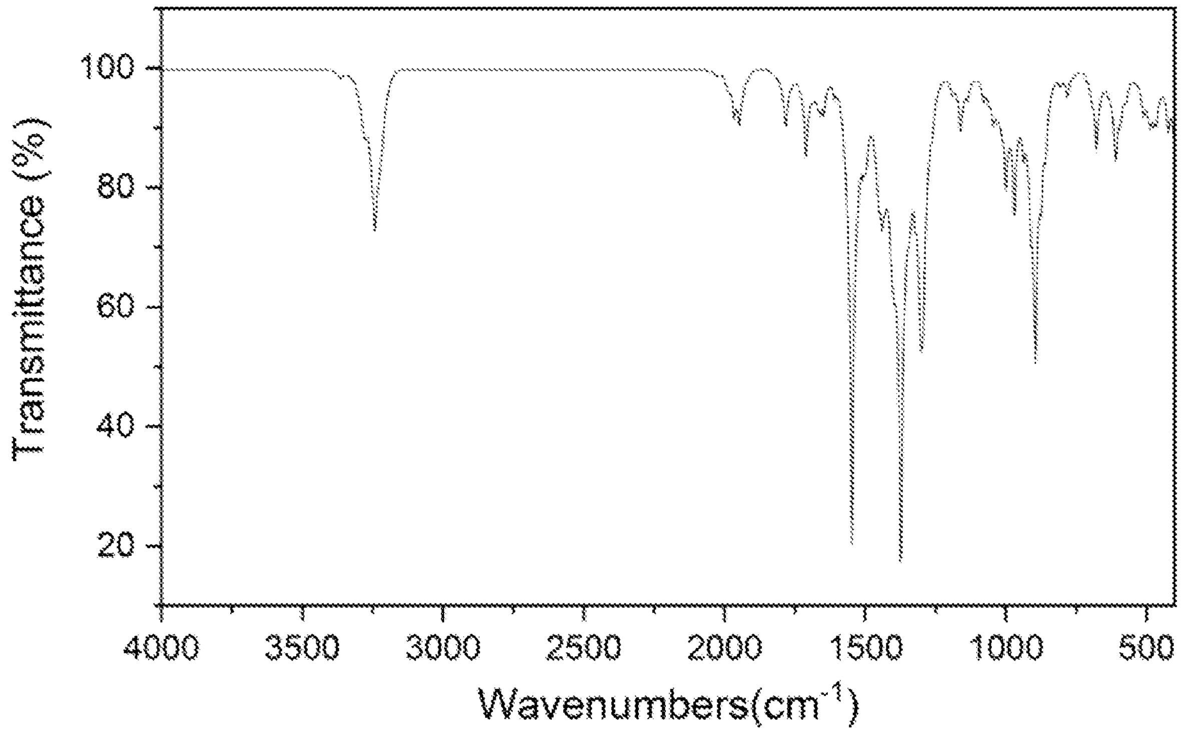
FIG. 2 is an infrared spectrum of a heteroatom-containing alkoxy polyether based anionic-nonionic surfactant prepared according to Example 3 of the present invention, wherein 3285 $cm^{-1}$ is a stretching vibration peak of N—H, 3235 $cm^{-1}$ is a stretching vibration peak of methyl and methylene, 1545 $cm^{-1}$ is a vibration peak of framework of an aromatic ring, 1383 $cm^{-1}$ and 1442 $cm^{-1}$ are bending vibration peaks of methyl and methylene, 1296 $cm^{-1}$ is a stretching vibration peak of an ether bond, 1040 $cm^{-1}$ is a bending vibration peak of C—N bond and 700-900 $cm^{-1}$ are stretching vibration peaks on the aromatic ring.
Figure 3:
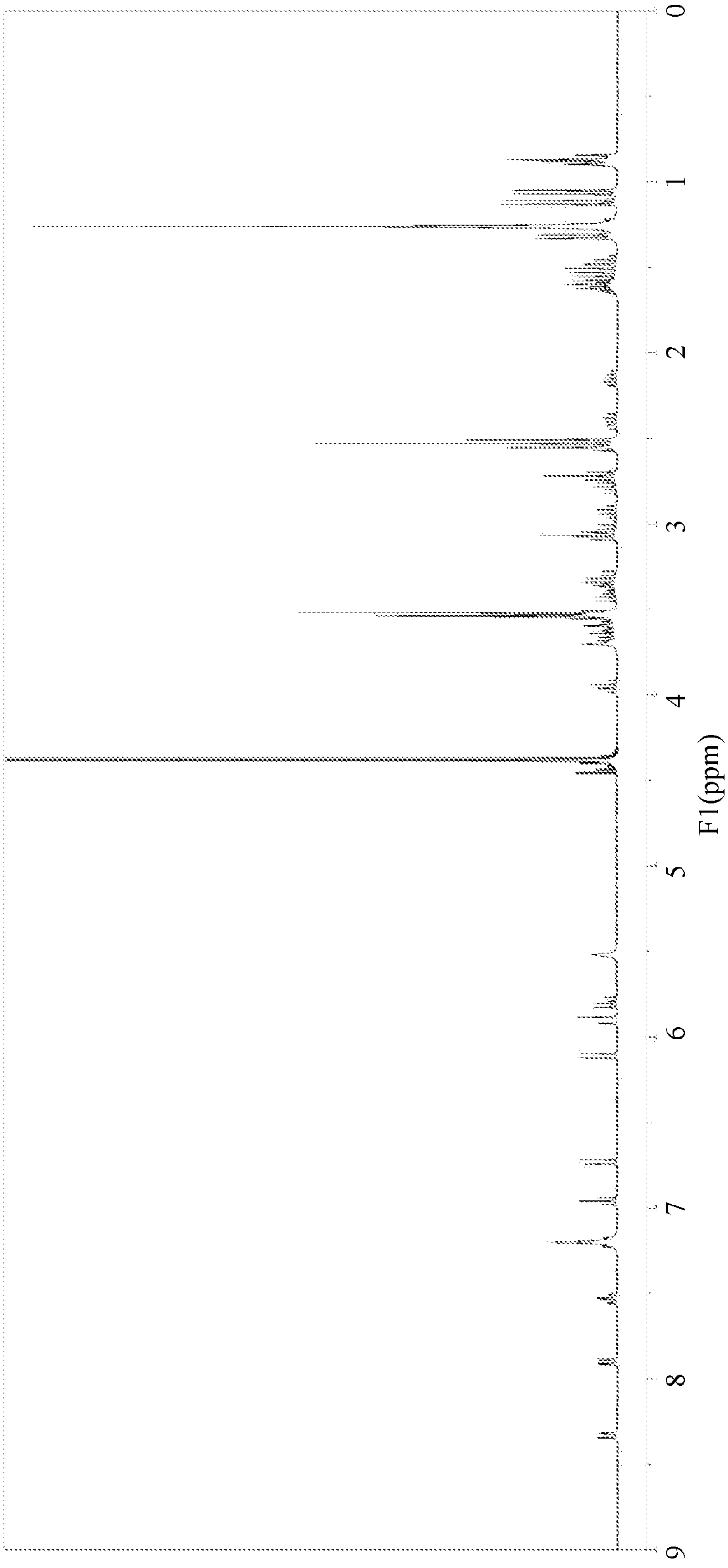
Figure 4:
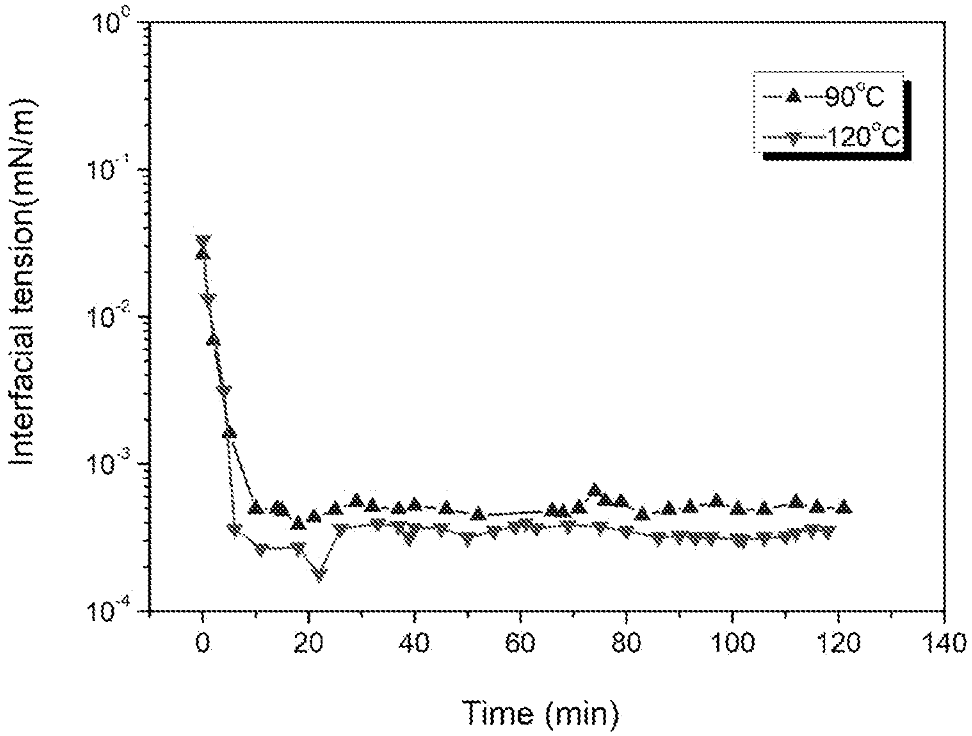

FIG. 4 is a plot of the oil-water interfacial tension of the heteroatom-containing alkoxy polyether based anionic-nonionic surfactant prepared according to Example 3 of the present invention, for which the test conditions include:

Surfactant concentration: 0.3 wt. %

Blue curve at 90° C.: mineralization degree of 35,000 mg/L, divalent ion content of 1,000 mg/L, and crude oil API=25, Red curve at 120° C.: mineralization degree of 300,000 mg/L, divalent ion content of 10,000 mg/L, and crude oil API=18

EMBODIMENTS OF THE INVENTION

The invention is further illustrated by the following Examples.

Example 1

Synthesis of Anionic-Nonionic Surfactant of Heteroatom N-Containing Sodium Phenolpolyether Carboxylate A certain amount of phenol and KOH in an amount of 1% relative to the weight of phenol as a catalyst were added into a polymerization reactor, the system was heated to 80-90° C. under stirring, a vacuum system was started, dehydrated for 1 hour, then purged with nitrogen for 3-4 times to remove air in the system. The reaction temperature was raised to 200° C., then metered butylene oxide was added slowly, and the reaction pressure was controlled to be <2.0 MPa to carry out etherification reaction. After this step of reaction was finished, a calculated amount of hydrazine hydrate was added, and reacted for 1 hour at a temperature of 100° C. and a pressure of 5 MPa. Then the temperature was raised to 180° C., a calculated amount of propylene oxide was continuously and slowly added, and after the reaction was finished, hydrazine hydrate was added again and reacted at 100° C. for 10 hours. The temperature was raised to 150° C. again, a calculated amount of ethylene oxide was added, for etherification reaction again until the reaction was finished (the reaction pressure being constant). The system was purged with nitrogen, and unreacted ethylene oxide was removed to provide a nonionic surfactant of phenol polyoxybutylene polyoxypropylene polyoxyethylene ether with different polymerization degrees.

The product obtained above and 2 times of molar amount of potassium hydroxide were added into a reactor, stirred, alkalized at 60° C. for 2 hours, heated to 80° C., sodium chloroacetate was slowly added, reaction was continued for 5 hours after the addition was finished, and post-treatment was carried out to provide an anionic-nonionic surfactant of heteroatom N-containing sodium phenol polyether carboxylate. The structure was shown in Table 1.

Example 2

Synthesis of Anionic-Nonionic Surfactant of Heteroatom N-Containing Calcium Nonylphenol Polyether Sulfonate A certain amount of nonylphenol and KOH in an amount of 0.5% relative to the weight of nonylphenol as a catalyst were added into a polymerization reactor, the system was heated to 80-90° C. under stirring, a vacuum system was started, dehydrated for 1 hour, then purged with nitrogen for 3-4 times to remove air in the system. The reaction temperature was raised to 170° C., then metered propylene oxide was added slowly, and the reaction pressure was controlled to be <0.60 MPa to carry out etherification reaction. After this step of reaction was finished, ethylene diamine was added, and reacted at a temperature of 150° C. and a pressure of 4 MPa for 8 hours. Then a calculated amount of butylene oxide was slowly added, and after the reaction was finished, ethylene diamine was added again and reacted at a temperature of 150° C. and a pressure of 4 MPa for 8 hours. Finally, a calculated amount of ethylene oxide was added, for etherification reaction again until the reaction was finished (the reaction pressure being constant). The system was purged with nitrogen, and unreacted ethylene oxide was removed to provide nonylphenol polyether nonionic surfactant.

The product obtained above and 2 times of molar amount of potassium hydroxide were added into a reactor, stirred, alkalized at 60° C. for 2 hours, heated to 90° C., sodium chlorohexylsulfonate was slowly added in dropwise, reaction was continued for 5 hours after the addition was finished, and then calcium chloride was added for ion exchange, to provide an anionic-nonionic surfactant of heteroatom N-containing calcium nonylphenol polyether sulfonate. The structure was shown in Table 1.

Example 3

Synthesis of Anionic-Nonionic Surfactant of Heteroatom N-Containing Ammonium Dodecylnaphthalene Polyether Benzenesulfonate A certain amount of dodecylnaphthol and KOH in an amount of 2.0% relative to the weight of dodecylnaphthol along with 30 ppm phosphazene as a catalyst were added into a polymerization reactor, the system was heated to 80-90° C. under stirring, a vacuum system was started, dehydrated for 1 hour, then purged with nitrogen for 3-4 times to remove air in the system. The reaction temperature was raised to 180° C., then metered butylene oxide was added slowly, and the reaction pressure was controlled to be <0.60 MPa to carry out etherification reaction. After this step of reaction was finished, propylene diamine was added, and reacted at a temperature of 250° C. and a pressure of 2 MPa for 6 hours. Then a calculated amount of propylene oxide was slowly added, and after the reaction was finished, propylene diamine was added again for an ammoniation reaction. Finally, a calculated amount of ethylene oxide was added again, for etherification reaction at 150° C. again until the reaction was finished (the reaction pressure being constant). The system was purged with nitrogen, and unreacted ethylene oxide was removed to provide dodecyl naphthalene polyether nonionic surfactant.

The product obtained above and 2 times of molar amount of potassium hydroxide were added into a reactor, stirred, alkalized at 60° C. for 2 hours, heated to 200° C., sodium p-chlorobenzenesulfonate was added, reaction was continued until complete conversion of the raw materials, and a post-treatment of ammonium exchange was carried out, to provide an anionic-nonionic surfactant of heteroatom N-containing ammonium dodecylnaphthalene polyether benzenesulfonate. The structure was shown in Table 1.

Example 4

Synthesis of Anionic-Nonionic Surfactant of Magnesium Methoxypolyether Carboxylate Containing Heteroatoms of S and N A certain amount of methanol and KOH in an amount of 0.5% relative to the weight of the methanol as catalysts were added into a polymerization reactor, the system was heated to 140° C. under stirring, then metered ethylene oxide was added slowly, and the reaction pressure was controlled to be <1.0 MPa to carry out etherification reaction. After this step of reaction was finished, 1,3-propanedithiol was continuously added slowly, and reacted at a temperature of 180° C. and a pressure of 2 MPa for 5 hours. Then a calculated amount of propylene oxide was added and reacted for 4 hours. After the reaction was finished, a calculated amount of para-phenylene diamine was added, and reacted at a temperature of 280° C. and a pressure of 2 MPa for 6 hours. Finally, a calculated amount of butylene oxide was added, and heated to 200° C. for etherification reaction again until the reaction was finished, to provide a nonionic surfactant of heteroatom-containing methoxy polyether.

The product obtained above and 2 times of molar amount of potassium hydroxide were added into a reactor, stirred, alkalized at 60° C. for 2 hours, heated to 90° C., sodium chloroacetate was slowly added in dropwise, reaction was continued for 5 hours after the addition was finished, and then $MgCl_2$ was added for ion exchange, to provide an anionic-nonionic surfactant of magnesium methoxypolyether carboxylate containing heteroatoms of S and N. The structure was shown in Table 1.

Example 5

Synthesis of Anionic-Nonionic Surfactant of Heteroatom N-Containing Sodium 2-Methyl-Benzyl Polyether Sulfonate A certain amount of 2-methyl-benzyl alcohol and KOH in an amount of 0.5% relative to the weight of the 2-methylbenzyl alcohol as catalysts were added into a polymerization reactor, the system was heated to 170° C. under stirring, then metered propylene oxide was added slowly, and the reaction pressure was controlled to be <1.0 MPa to carry out etherification reaction. After this step of reaction was finished, p-phenylene diamine was added, heated to 200° C. and reacted for 6 hours. Then the temperature was reduced to 150° C., a calculated amount of ethylene oxide was added, and after the reaction was finished, ethylene diamine was added, heated to 180° C. again and reacted for 4 hours. Finally, a calculated amount of butylene oxide was added, for etherification reaction again until the reaction was finished, to provide a nonionic surfactant of heteroatom N-containing 2-methyl-benzyl polyether.

The product obtained above and 2 times of molar amount of potassium hydroxide were added into a reactor, stirred, alkalized at 60° C. for 2 hours, heated to 80° C., sodium 3-chloro-2-hydroxy-propanesulfonate was slowly added dropwise, reaction was continued for 5 hours after the addition was finished, and post-treatment was carried out to provide an anionic-nonionic surfactant of heteroatom N-containing sodium 2-methyl-benzyl polyether sulfonate. The structure was shown in Table 1.

Example 6

Synthesis of Anionic-Nonionic Surfactant of Heteroatom N-Containing Sodium Cis-9-Octadecenoloxy Polyether Sulfonate A certain amount of oleyl alcohol (cis-9-octadecenol) and KOH in an amount of 0.5% relative to the weight of the oleyl alcohol as catalysts were added into a polymerization reactor, the system was heated to 170° C. under stirring, then metered butylene oxide was added slowly, and the reaction pressure was controlled to be <1.0 MPa to carry out etherification reaction. After this step of reaction was finished, p-phenylene diamine was added, heated to 250° C. and reacted for 6 hours. Then the temperature was reduced to 170° C., a calculated amount of propylene oxide was added, and reacted for 5 hours. After the reaction was finished, ethylene diamine was added, heated to 180° C. again and reacted for 4 hours. Finally, a calculated amount of ethylene oxide was added, for etherification reaction again until the reaction was finished (the reaction pressure being constant). The system was purged with nitrogen, and unreacted ethylene oxide was removed to provide a polyether nonionic surfactant.

The product obtained above and 2 times of molar amount of potassium hydroxide were added into a reactor, stirred, alkalized at 60° C. for 2 hours, heated to 90° C., sodium 2-chloroethyl sulfonate was slowly added in dropwise, reaction was continued for 5 hours after the addition was finished, and post-treatment was carried out to provide an anionic-nonionic surfactant of heteroatom N-containing sodium cis-9-octadecenoloxy polyether sulfonate. The structure was shown in Table 1.

Example 7

Synthesis of Anionic-Nonionic Surfactant of Heteroatom N-Containing Sodium Polyether Carboxylate with a Long Carbon Chain A certain amount of $C_{30}H_{61}OH$ and KOH in an amount of 0.5% relative to the weight of the $C_{30}H_{61}OH$ along with 0.01% di-metallic polyether catalyst (DMC) as catalyst were added into a polymerization reactor, the system was heated to 200° C. under stirring, then metered butylene oxide was added slowly, and the reaction pressure was controlled to be <1.0 MPa to carry out etherification reaction. After this step of reaction was finished, p-phenylene diamine was added, and reacted for 6 hours. Then the temperature was reduced to 170° C., a calculated amount of propylene oxide was added, and reacted for 5 hours. After the reaction was finished, ethylene diamine was added, heated to 180° C. again and reacted for 4 hours. Finally, the temperature was reduced to 150° C., and a calculated amount of ethylene oxide was added, for etherification reaction again until the reaction was finished (the reaction pressure being constant). The system was purged with nitrogen, and unreacted ethylene oxide was removed, to provide a nonionic surfactant of polyether with a long carbon chain.

The product obtained above and 2 times of molar amount of potassium hydroxide were added into a reactor, stirred, alkalized at 60° C. for 2 hours, heated to 90° C., sodium chloroacetate was slowly added in dropwise, reaction was continued for 5 hours after the addition was finished, and post-treatment was carried out to provide an anionic-nonionic surfactant of heteroatom N-containing sodium polyether carboxylate with a long carbon chain. The structure was shown in Table 1.

Example 8

Synthesis of Heteroatom N-Containing Ammonium Dodecylnaphthalene Polyether Benzenesulfonate A certain amount of dodecylnaphthol and KOH in an amount of 2.0% relative to the weight of dodecylnaphthol along with 30 ppm phosphazene as a catalyst were added into a polymerization reactor, the system was heated to 80-90° C. under stirring, a vacuum system was started, dehydrated for 1 hour, then purged with nitrogen for 3-4 times to remove air in the system. The reaction temperature was raised to 160° C., then metered propylene oxide was added slowly, and the reaction pressure was controlled to be <0.60 MPa to carry out etherification reaction. After this step of reaction was finished, propylene diamine was added, and reacted at a temperature of 250° C. and a pressure of 2 MPa for 6 hours. Then a calculated amount of propylene oxide was added, and after the reaction was finished, propylene diamine was added again for an ammoniation reaction. Finally, a calculated amount of ethylene oxide was added again, for etherification reaction at 150° C. again until the reaction was finished (the reaction pressure being constant). The system was purged with nitrogen, and unreacted ethylene oxide was removed to provide dodecyl naphthalene polyether nonionic surfactant.

The product obtained above and 2 times of molar amount of potassium hydroxide were added into a reactor, stirred, alkalized at 60° C. for 2 hours, heated to 200° C., sodium p-chlorobenzenesulfonate was added, reaction was continued until complete conversion of the raw materials, to provide an anionic-nonionic surfactant of heteroatom N-containing sodium dodecylnaphthalene polyether benzenesulfonate. The structure was shown in Table 1.

Example 9

Synthesis of Anionic-Nonionic Surfactant of Heteroatom N-Containing Ammonium Cis-9-Octadecenoloxy Polyether Sulfonate A certain amount of oleyl alcohol (cis-9-octadecenol) and KOH in an amount of 0.5% relative to the weight of the oleyl alcohol as catalysts were added into a polymerization reactor, the system was heated to 170° C. under stirring, then metered butylene oxide was added slowly, and the reaction pressure was controlled to be <1.0 MPa to carry out etherification reaction. After this step of reaction was finished, p-phenylene diamine was added, heated to 280° C. and reacted for 6 hours. Then, the temperature was reduced to 150° C., and a calculated amount of butylene oxide was added to be reacted for 5 hours, for etherification reaction again until the reaction was finished (the reaction pressure being constant). The system was purged with nitrogen, and unreacted butylene oxide was removed, to provide a polyether nonionic surfactant.

The product obtained above and 2 times of molar amount of potassium hydroxide were added into a reactor, stirred, alkalized at 60° C. for 2 hours, heated to 90° C., sodium 2-chloroethyl sulfonate was slowly added in dropwise, reaction was continued for 5 hours after the addition was finished, and post-treatment of ammonium exchange was carried out, to provide an anionic-nonionic surfactant of heteroatom N-containing sodium cis-9-octadecenoloxy polyether sulfonate. The structure was shown in Table 1.

Example 10

Evaluation of Emulsifying Property of Surfactant

The phase evaluation was performed according to SPE 113313 method to calculate the emulsifying capacity. The method mainly comprised the following steps: adding an aqueous solution of surfactant of a desired volume and concentration to a glass tube, and then adding crude oil to the solution, at a water-oil ratio in volume (WOR) of about 1.0. Sealing was followed by mixing. The mixture obtained was then placed in a metal bath, heated to a set temperature, and periodically sampled to mix, so as to enhance mass transfer between the phases. Equilibrium was considered to be reached until the visual interface position did not change. The emulsifying capacity was expressed in terms of the solubilization parameter SP, i.e., the volume or weight of water solubilized by unit volume or weight of surfactant in an oil, or the volume or weight of an oil solubilized by unit volume or weight of surfactant in water. The results were shown in Tables 2 and 3.

Example 11

Evaluation of Interfacial Properties of Surfactant

The interfacial tension change between the 0.3 wt % surfactant and a crude oil was measured with a TX-500C Spinning Drop Interface Tensiometer or a Dataphysics SVT20 under the conditions of oil reservoir temperature and a rotation speed of 5000 r/min, until oil drops were balanced. The results were shown in Tables 2 and 3.

Example 12

Evaluation of Oil-Washing Properties of Surfactant

A certain amount of oil-sand, with oil:sand=1:4 (weight ratio), was aged at the reservoir temperature for 10 days, during which stirring was carried out for 5 minutes every 2 hours. 5 g of the aged oil-sand was then mixed uniformly with a 0.3 wt % surfactant solution with a weight ratio of the oil-sand:the solution=1:10, and aged for 48 hours at the oil reservoir temperature. Crude oil in the solution was extracted with petroleum ether, adjusted with a 50 ml colorimetric tube to a metered volume, colorimetric analyzed with a spectrophotometer at a wavelength of 430 nm. The concentration of crude oil in the surfactant solution was calculated by referring to the standard curve. The results were shown in Tables 2 and 3.

Example 13

Evaluation of Oil Displacement Property of Surfactant

The oil displacement effect was physically simulated using the complex oil displacement system according to the SY/T6424-2000 complex oil displacement system performance test method, where a simulated oil displacement experiment was carried out at the oil reservoir temperature. Firstly, the core was injected with water till no crude oil was found in the effluent, then with a 0.3PV (pore volume of the core) of the surfactant composition, then with water till no crude oil was found in the effluent, so that the crude oil recovery improved was calculated. The results were shown in Tables 2 and 3.

Comparative Example 1

$C_{30}H_{61}O(CH_2CH_2)_{10}CH_2CH_2COONa$ was prepared according to the process of CN201210188897.6, and property evaluations were performed, and the results were shown in Tables 2 and 3.

Comparative Example 2

The surfactant $C_{30}H_{61}O—(BO)_8—(PO)_{12}\text{-}(EO)_{30}—SO_3Na$ was prepared according to the process of US20110281779A1, and the properties were evaluated, and the results were shown in Tables 2 and 3.

TABLE 1

Surfactant compositions and structures of Examples 1-7

| Examples | Surfactant $R_1—O—(R_2O)_x\text{-}L_1\text{-}(R_3O)_y\text{-}L_2\text{-}(R_4O)_z\text{-}X\text{-}Y^{a-}{}_{a/b}M^{b+}$ |
|---|---|
| 1 | $R_1$ = phenyl, $R_2 = C_4H_8$, $R_3 = C_3H_6$, $R_4 = C_2H_4$, $L_1 = L_2$ = HNNH, x = 28, y = 20, z = 40, X = $CH_2$, Y = $COO^-$, a = b = 1, M = $Na^+$ |
| 2 | $R_1$ = nonylphenyl, $R_2 = C_3H_6$, $R_3 = C_4H_8$, $R_4 = C_2H_4$, $L_1 = L_2 = HNCH_2CH_2NH$, x = 50, y = 12, z = 50, X = $C_6H_{12}$, Y = $SO_3^-$, a = 1, b = 2, M = $Ca^{2+}$ |
| 3 | $R_1$ = dodecylnaphthalene, $R_2 = C_4H_8$, $R_3 = C_3H_6$, $R_4 = C_2H_4$, $L_1 = L_2 = HNCH_2CH_2CH_2NH$, x = 1, y = 50, z = 42, X = $C_6H_4$, Y = $SO_3^-$, a = 1, b = 1, M = $NH_4^+$ |
| 4 | $R_1 = CH_3$, $R_2 = C_2H_4$, $R_3 = C_3H_6$, $R_4 = C_4H_8$, $L_1 = SCH_2CH_2CH_2S$, $L_2 = HNC_6H_4NH$, x = 22, y = 50, z = 1, X = $CH_2$, Y = $COO^-$, a = 1, b = 2, M = $Mg^{2+}$ |
| 5 | $R_1$ = 2—$CH_3$—$C_6H_4$_$CH_2OH$, $R_2 = C_3H_6$, $R_3 = C_2H_4$, $R_4 = C_4H_8$, $L_1 = HNC_6H_4NH$, $L_2 = HNCH_2CH_2NH$, x = 50, y = 45, z = 15, X = $CH_2CH(OH)CH_2$, Y = $SO_3^-$, a = 1, b = 1, M = $Na^+$ |
| 6 | $R_1 = C_{18}H_{35}$, $R_2 = C_4H_8$, $R_3 = C_3H_6$, $R_4 = C_2H_4$, $L_1 = HNC_6H_4NH$, $L_2 = HNCH_2CH_2NH$, x = 38, y = 1, z = 32, X = $C_2H_4$, Y = $SO_3^-$, a = 1, b = 1, M = $Na^+$ |
| 7 | $R_1 = C_{30}H_{61}$, $R_2 = C_4H_8$, $R_3 = C_3H_6$, $R_4 = C_2H_4$, $L_1 = HNC_6H_4NH$, $L_2 = HNCH_2CH_2NH$, x = 8, y = 12, z = 30, X = $CH_2$, Y = $COO^-$, a = 1, b = 1, M = $Na^+$ |

TABLE 1-continued

Surfactant compositions and structures of Examples 1-7

| Examples | Surfactant $R_1$ —O— $(R_2O)_x$ - $L_1$ - $(R_3O)_y$ - $L_2$ - $(R_4O)_z$ - X-$Y^{a-}{}_{a/b}M^{b+}$ |
|---|---|
| 8 | $R_1$ = dodecylnaphthalene, $R_2 = C_3H_6$, $R_3 = C_3H_6$, $R_4 = C_2H_4$, $L_1$ = $L_2$ = $HNCH_2CH_2CH_2NH$, x = 20, y = 30, z = 35, X = $C_6H_4$, Y = $SO_3^-$, a = 1, b = 1, M = $Na^+$ |
| 9 | $R_1 = C_{18}H_{35}$, $R_u = C_4H_8$, $L_1 = HNC_6H_4NH$, x = 15, y = 10 ($L_2$, z is 0), X = $C_2H_4$, Y = $SO_3^-$, a = 1, b = 1, M = $NH_4^+$ |
| C. Ex. 1 | $C_{30}H_{61}O(CH_2CH_2O)_{10}CH_2CH_2COONa$ |
| C. Ex. 2 | $C_{30}H_{61}O$—$(BO)_8$—$(PO)_{12}$-$(EO)_{30}$—$SO_3Na$ |

TABLE 2

High temperature property of surfactants of Examples 1-7
Test conditions: 90° C., TDS of 35,000 mg/L, divalent ion content of 1,000 mg/L, crude oil API = 25, core permeability of 220 mD

| Examples | Solubilization parameters | Interfacial tension (mN/m) | Oil washing property (%) | Improved recovery (%) |
|---|---|---|---|---|
| 1 | 12.5 | 0.00178 | 63 | 8.9 |
| 2 | 13.3 | 0.000997 | 68 | 9.2 |
| 3 | 17.2 | 0.000501 | 79 | 14.3 |
| 4 | 12.8 | 0.00160 | 62 | 9.3 |
| 5 | 14.1 | 0.00103 | 65 | 11.1 |
| 6 | 16.0 | 0.000611 | 73 | 13.3 |
| 7 | 13.3 | 0.000965 | 69 | 12.2 |
| 8 | 17.0 | 0.000521 | 78 | 14.1 |
| 9 | 15.8 | 0.000631 | 72.5 | 13.2 |
| C. Ex. 1 | 6.8 | 0.0135 | 35 | 4.6 |
| C. Ex. 2 | 8.0 | 0.00446 | 51 | 7.0 |

The surfactant composition produced by Example 3 was formulated into different concentrations, each was tested for the oil-water interfacial tension with the crude oil above. The results were listed in Table 3.

TABLE 3 oil-water interfacial tension between the surfactants
(at different concentrations) and the crude oil

| Amount of the surfactant (wt %) | 0.05 | 0.1 | 0.2 | 0.3 |
|---|---|---|---|---|
| Interfacial tension (mN/m) | 0.00526 | 0.000999 | 0.000688 | 0.000501 |

The results showed that the surfactant according to the invention had high oil-water interfacial activity for the tested thickened oil.

The surfactant of the invention was used for high-temperature and high-salinity thickened oil reservoirs, and the oil-water interfacial tension of the surfactant was tested, and the result was shown in Table 4.

TABLE 4

High temperature property of surfactants of Examples 1-7
Test conditions: 120° C., TDS of 300,000 mg/L, divalent ion content of 10,000 mg/L, crude oil API = 18, and core permeability of 500 mD

| Examples | Solubilization parameters | Interfacial tension (mN/m) | Oil washing property (%) | Improved oil recovery (%) |
|---|---|---|---|---|
| 1 | 14.1 | 0.00100 | 65 | 8.8 |
| 2 | 13.3 | 0.00203 | 67 | 9.3 |
| 3 | 18.0 | 0.000379 | 82 | 15.1 |
| 4 | 12.7 | 0.00343 | 66 | 8.4 |

TABLE 4-continued

High temperature property of surfactants of Examples 1-7
Test conditions: 120° C., TDS of 300,000 mg/L, divalent ion content of 10,000 mg/L, and core permeability of 500 mD

| Examples | Solubilization parameters | Interfacial tension (mN/m) | Oil washing property (%) | Improved oil recovery (%) |
|---|---|---|---|---|
| 5 | 16.4 | 0.00266 | 72 | 12.2 |
| 6 | 18.1 | 0.000421 | 74 | 14.9 |
| 7 | 15.2 | 0.00388 | 64 | 9.3 |
| 8 | 17.9 | 0.000399 | 81 | 14.9 |
| 9 | 18.0 | 0.000429 | 74 | 14.8 |
| C. Ex. 1 | 5.6 | 0.0422 | 34 | 3.7 |
| C. Ex. 2 | 9.1 | 0.00518 | 52 | 7.3 |

As seen from the results in Tables 2, 3 and 4, the surfactants prepared by the present invention were superior in performances. The present inventors surprisingly found that both the emulsifying ability and the oil-washing ability were significantly improved, and an unexpected effect of improving the recovery ratio was obtained, as compared with Comparative Examples 1 and 2.

What is claimed is:

1. A surfactant having a formula (I):

$$R_1—O\text{-}(Poly)_n\text{-}X—Y^{a-}{}_{a/b}M^{b+}; \tag{I}$$

wherein:

$R_1$ is any one of $C_1$-$C_{50}$ aliphatic group or aromatic group;

each occurrence of group Poly, equal to or different from each other, is independently selected from the group represented by formula $(Ru—O)_m$; in each group Poly, the each occurrence of group Ru, equal to or different from each other, is independently selected from $C_{2-6}$ linear or branched alkylene group, with the proviso that: the group Ru in at least a part of the groups Poly is selected from butylene, and there is a spacer group L between at least a part of the groups Poly; wherein the L is a group containing a heteroatom and two free ends having 0 to 30 carbon atoms, wherein the heteroatom is N and/or S;

n is a number from greater than 0 to 300;

for each type of group (Ru—O), m is independently a number from greater than 0 to 100;

X is any one of alkylene, alkenylene or arylene containing 1-10 carbon atoms;

Y is an anionic group;

M is a cation or cationic group maintaining charge balance of the formula; and a is the absolute value of the valence of Y, and b is the absolute value of the valence of M.

2. The surfactant according to claim 1, characterized in that $R_1$ is any one of $C_1$-$C_{50}$ alkyl, alkenyl, aryl, or polycyclic aromatic hydrocarbon; and the heteroatom is N and/or S.

3. The surfactant according to claim 1, characterized in that L is at least one selected from —$NR_6$—, —S—, and —$X^1$—$R_5$—$X^2$—, wherein $X^1$ and $X^2$ are independently selected from $NR_6$ or S, $R_5$ is any one selected from $C_0$-$C_{10}$ alkylene, alkenylene and arylene, and $R_6$ is selected from H or $C_1$-$C_4$ alky.

4. The surfactant according to claim 3, characterized in that $R_5$ is any one selected from the group consisting of $C_0$-$C_6$ alkylene, alkenylene and arylene groups, and $R_6$ is selected from H.

5. The surfactant according to claim 1, characterized in that m is independently any number of 1 to 50.

6. The surfactant according to claim 1, characterized in that X is any one of an alkylene group, an alkenylene group, and an arylene group containing 1 to 6 carbon atoms.

7. The surfactant according to claim 1, characterized in that the anionic group is at least one of carboxylate, sulfonate, sulfate, or phosphate; the M is at least one selected from the group consisting of an alkali metal cation, an alkaline earth metal cation, and an ammonium ion.

8. The surfactant according to claim 1, characterized in that two or more identical or different spacer groups L are included in formula (I), and wherein at least one group Poly is positioned between two spacer groups L.

9. The surfactant according to claim 1, characterized in that in each of the groups Poly, at least a part of the group Ru of the groups Poly is selected from ethylene, at least a part of the group Ru of the groups Poly is selected from propylene or isopropylene, and at least a part of the group Ru of the groups Poly is selected from butylene, sec-butylene, isobutylene, or tert-butylene.

10. The surfactant according to claim 1, characterized in that at least two spacer groups L are comprised in formula (I), wherein at least a part of the groups L comprise heteroatom N and at least a part of the groups L comprise heteroatom S.

11. The surfactant according to claim 1, characterized in that in formula (I), the group Poly approaching to the $R_1$ side has more carbon atoms than the group Poly approaching to the X side.

12. A surfactant having a molecular formula (II):

$$R_1—O—(R_2O)_x\text{-}L_1\text{-}(R_3O)_y\text{-}L_2\text{-}(R_4O)_z—X—Y^{a-}\cdot a/bM^{b+}; \quad (II)$$

wherein:

$R_1$ is any one of $C_1$-$C_{50}$ aliphatic group or aromatic group;

$R_2$, $R_3$ and $R_4$ are at least one independently selected from the group consisting of ethylene, propylene and butylene, and x, y and z are each independently any number from greater than 0 to 100;

$L_1$ and $L_2$ are independently a heteroatom-containing group having 0-30 carbon atoms and two free ends, wherein the heteroatom is N and/or S;

X is any one of alkylene, alkenylene or arylene containing 1-10 carbon atoms;

Y is an anionic group;

M is a cation or cationic group maintaining charge balance of the formula; and a is the absolute value of the valence of Y, and b is the absolute value of the valence of M.

13. A process of producing the surfactant according to claim 1, comprising the steps of:

a) carrying out an alkoxylation reaction on an initiator, ethylene oxide, propylene oxide and butylene oxide in the presence of a catalyst, to provide an alkoxy polyether nonionic surfactant; wherein the initiator is any one of $C_1$-$C_{50}$ alkyl alcohol, alkenyl alcohol, alkylphenol and polycyclic aromatic phenol;

b) reacting the alkoxy polyether nonionic surfactant obtained in step a) with an organic amine reagent or a thiol reagent, to provide an alkoxy polyether nonionic surfactant containing N and/or S heteroatoms; and c) carrying out sulfonation or carboxylation reaction on the alkoxy polyether nonionic surfactant containing the heteroatom obtained in step b) and a sulfonation reagent or a carboxylation reagent, and then neutralizing, to provide the alkoxy polyether based anionic-nonionic surfactant.

14. The process of producing the surfactant according to claim 13, wherein the alkoxylation reaction is carried out under conditions of: a reaction temperature of 140 to 200° C. and a reaction pressure of 0 to 5 MPa; a molar ratio of the initiator to the ethylene oxide, the propylene oxide or the butylene oxide of 1:(1-50); and a catalyst of an alkali metal hydroxide, DMC di-metallic polyether catalyst or phosphazene catalyst, in an amount of 0.001 to 2.0% based on the initiator; step b) is carried out at a temperature of 100 to 300° C. and a reaction pressure of 0 to 5 MPa, for 1 to 10 hours; and the sulfonation or carboxylation reaction is carried out at a reaction temperature of 80 to 200° C. and a reaction pressure of 0 to 3 MPa.

15. A process of producing the surfactant according to claim 12, comprising the steps of:

a) carrying out an alkoxylation reaction on an initiator, ethylene oxide, propylene oxide and butylene oxide in the presence of a catalyst, to provide an alkoxy polyether nonionic surfactant; wherein the initiator is any one of $C_1$-$C_{50}$ alkyl alcohol, alkenyl alcohol, alkylphenol and polycyclic aromatic phenol;

b) reacting the alkoxy polyether nonionic surfactant obtained in step a) with an organic amine reagent or a thiol reagent, to provide an alkoxy polyether nonionic surfactant containing N and/or S heteroatoms; and c) carrying out sulfonation or carboxylation reaction on the alkoxy polyether nonionic surfactant containing the heteroatom obtained in step b) and a sulfonation reagent or a carboxylation reagent, and then neutralizing, to provide the alkoxy polyether based anionic-nonionic surfactant.

16. The process of producing the surfactant according to claim 15, wherein the alkoxylation reaction is carried out under conditions of: a reaction temperature of 140 to 200° C. and a reaction pressure of 0 to 5 MPa; a molar ratio of the initiator to the ethylene oxide, the propylene oxide or the butylene oxide of 1:(1-50); and a catalyst of an alkali metal hydroxide, DMC di-metallic polyether catalyst or phosphazene catalyst, in an amount of 0.001 to 2.0% based on the initiator; step b) is carried out at a temperature of 100 to 300° C. and a reaction pressure of 0 to 5 MPa, for 1 to 10 hours; and the sulfonation or carboxylation reaction is carried out at a reaction temperature of 80 to 200° C. and a reaction pressure of 0 to 3 MPa.

* * * * *